(12) United States Patent
Stobbart

(10) Patent No.: US 10,415,729 B2
(45) Date of Patent: Sep. 17, 2019

(54) SEAL RING AND JOINT

(75) Inventor: John Stobbart, Swansea (GB)

(73) Assignee: Freudenberg Oil & Gas Technologies Limited, Port Talbot (GB)

( * ) Notice: Subject to any disclaimer, the term of this patent is extended or adjusted under 35 U.S.C. 154(b) by 622 days.

(21) Appl. No.: 12/917,110

(22) Filed: Nov. 1, 2010

(65) Prior Publication Data

US 2011/0266797 A1    Nov. 3, 2011

(30) Foreign Application Priority Data

Nov. 4, 2009  (GB) .................................. 0919321.0

(51) Int. Cl.
    *F16L 23/20*    (2006.01)
(52) U.S. Cl.
    CPC ..................................... *F16L 23/20* (2013.01)
(58) Field of Classification Search
    USPC ................ 285/109, 110, 112, 113, 331, 336; 277/606, 608, 609, 626, 644
    See application file for complete search history.

(56) References Cited

U.S. PATENT DOCUMENTS

| | | | | |
|---|---|---|---|---|
| 1,921,642 | A | * | 8/1933 | Stephenson .................... 285/331 |
| 2,087,185 | A | * | 7/1937 | Dillon ............................ 285/111 |
| 4,269,437 | A | * | 5/1981 | Shaw et al. .................... 285/109 |
| 5,466,018 | A | * | 11/1995 | Stobbart ..................... 285/334.2 |
| 5,529,284 | A | * | 6/1996 | Berger et al. ................. 251/149 |
| 5,620,187 | A | * | 4/1997 | Jia ................................. 277/614 |

(Continued)

FOREIGN PATENT DOCUMENTS

| | | |
|---|---|---|
| EP | 2265196 A1 | 9/1993 |
| WO | WO2003/18331 A1 | 9/1993 |

OTHER PUBLICATIONS

Search Report Under Section 17(5) for Priority Application GB0919321.0 dated Feb. 9, 2010.

*Primary Examiner* — Anna M Momper
*Assistant Examiner* — James A Linford
(74) *Attorney, Agent, or Firm* — Daniel J. Sepanik, Esq.; Harness, Dickey & Pierce, P.L.C.

(57) ABSTRACT

A seal ring and connection joint for conduits, pressure vessels or the like. A conduit joint can have an annular seal ring with an inner integrally formed sealing portions, an outer integrally formed sealing portion, and an interconnecting web portion, the inner sealing portions comprising a pair of inner annular seal lips facing the outer sealing portion and extending in a transverse direction to the web portion, the outer seal portion including a pair of outer annular seal lips facing the inner seal portion and extending in a transverse direction to the web portion, which web portion extends radially between the pair of seal lips on the inner seal portion and the pair of seal lips on the outer seal portion, the seal ring being interposed at an interface between a pair of conduit or vessel defining members, the conduit or vessel defining members being each provided at the interface with an annular ridge portion, wherein upon initial seating of the ridge portion with the seal ring prior to tightening the joint, one of either the inner or outer annular seal lips contacts a the ridge portion, whereas the other of the inner or outer annular seal lips is offset from the ridge portion by a clearance gap.

1 Claim, 2 Drawing Sheets

(56) References Cited

U.S. PATENT DOCUMENTS

| | | | | |
|---|---|---|---|---|
| 5,707,152 A | * | 1/1998 | Krywitsky | F16L 55/115 |
| | | | | 374/208 |
| 5,752,725 A | * | 5/1998 | El-Sobky | 285/21.1 |
| 5,858,311 A | * | 1/1999 | Bachtel | 422/109 |
| 2001/0045709 A1 | * | 11/2001 | Stobbart | 277/602 |

* cited by examiner

SEAL RING AND JOINT

BENEFIT CLAIM

This application is based on, and claims the benefit of priority to, UK application GB 0919321.0, filed 4 Nov. 2009, which priority application is hereby incorporated by reference.

BACKGROUND OF THE INVENTION

1. Field of the Invention

The present invention relates to a seal ring and connection joint for conduits, pressure vessels or the like.

2. Description of Related Art

When connecting adjacent sections of fluid flow conduits or vessels, seal rings are typically interposed at the interface of adjacent connecting flanged conduits or vessel portions which are then bolted or clamped together. The seal ring is typically metallic, the seal being affected by elastic or plastic deformation of a sealing lip of the seal ring against a sealing surface.

Most known seal rings and joints work, to a greater or lesser extent, when the pressure within the conduit, pressure vessel or the like is considerably greater than the ambient pressure outside of the conduit, pressure vessel or the like i.e. the seal or joint is pressure energized. They do, however, work less satisfactorily when the internal and external pressures are similar or, even, when the external pressure is greater than the internal pressure, i.e. the seal is not pressure energized.

US2001045709 discloses a seal ring and associated connection joint. US2001045709 discloses an annular seal ring comprising an inner integrally formed sealing portion, an outer integrally formed sealing portion, and an interconnecting web portion. The inner sealing portion comprises a pair of annular seal lips facing the outer sealing portion and extends in a transverse direction to said web portion, wherein the outer seal portion comprises a pair of annular seal lips facing the inner seal portion and extends in a transverse direction to said web portion. The web portion extends radially between the pair of seal lips on the inner seal portion and the pair of seal lips on the outer seal portion, and each respective seal lip is arranged to project transversely from said web portion by a distance which is substantially greater than the thickness of said web portion in a direction substantially perpendicular to the radial direction. US2001045709 also discloses a conduit joint comprising a seal ring interposed at an interface between a pair of conduits or vessel defining members, wherein the conduits or vessel defining members are provided at the interface with respective recessed portions, complementarily shaped and dimensioned to receive respective portions of the inner and outer annular seal ring. A first inner recessed portion comprises a radially outer surface sloped away from the interface in an inwardly radial direction, and a second of the recessed portions comprises a radially inner surface sloping away from the interface in an outwardly radial direction.

According to US2001045709 it is preferred that the dimensions of the inner and outer sealing portions 5, 9 of seal ring 4 are substantially similar to each other. This results in the inner and outer sealing portions undergoing substantially equal amounts of deformation on tightening of the joint. This preference was based on the assumption that if the dimensions of one sealing portion were significantly larger than those of the other, it would necessarily result in the sealing portion of lesser dimensions undergoing higher deformation and likely to fracture on tightening of the joint.

BRIEF SUMMARY OF THE INVENTION

The object of the present invention is to provide a seal ring and joint which allows the contact pressures between respective sealing surfaces to be independently chosen.

According to the present invention there is an annular seal ring comprising an inner integrally formed sealing portions, an outer integrally formed sealing portion, and an interconnecting web portion, said inner sealing portions comprising a pair of inner annular seal lips facing said outer sealing portion and extending in a transverse direction to said web portion, said outer seal portion comprising a pair of outer annular seal lips facing said inner seal portion and extending in a transverse direction to said web portion, which web portion extends radially between said pair of seal lips on the inner seal portion and said pair of seal lips on the outer seal portion, said seal ring being interposed at an interface between a pair of conduit or vessel defining members, said conduit or vessel defining members being each provided at said interface with an annular ridge portion, wherein upon initial seating of the ridge portion with the seal ring prior to tightening the joint, one of the other of the inner or outer annular seal lips contacts a said ridge portion, whereas the other of the inner or outer annular seal lips is offset from the ridge portion by a clearance gap.

Preferably as the joint is tightened one of the sealing lips begins to engage first, so that the contact pressures to be exerted on its seal lips begin to build up before the other sealing section begins to engage.

Usually it is preferred that the inner sealing portion is the main seal, and the outer seal is a secondary seal which presents leaks if the inner main seal fails. Additionally, in particular for marine environments, the outer seal prevents ingress of unwanted matter such as sea life.

The inner sealing portion or outer sealing portion of the conduit joint that comprises the inner or outer seal lips respectively that contacts the ridge portion first on initial seating of the ridge portion with the seal ring, preferably comprises a greater radial width than the other of the inner or outer sealing portions. The radial width may also be termed the radial thickness. The benefit of such a configuration is that the strength of the seal for which sealing portion contact pressure is increased is also accordingly increased.

On tightening the joint, the inner or outer pair of seal lips that initially contact the ridge portion upon initial seating of the ridge portion with a seal ring, preferably exert a higher contact pressure between the seal lips and the ridge portion than the other of the inner or outer pair of annular seal lips, wherein the contact pressure is balanced by the stresses in the seal ring.

On tightening of the conduit joint, at least one of the inner or outer integrally formed sealing portions preferably deflect elastically. Accordingly, when the conduit joint is disassembled the seal ring has undergone substantially no plastic deformation and can be reused.

It will be appreciated that the inner sealing portion or the outer sealing portion may be of increased radial width depending on the seal requirements.

The pair of inner annular seal lips beneficially slope radially outwardly and toward one or another to the web portion. The pair of outer annular seal lips beneficially slope radially inwardly and towards one another to the web portion.

The inner integrally formed sealing portion preferably comprises a radially inwardly surface and the outer integrally formed sealing portion preferably comprises a radially outer surface, wherein the inner and the outer surface are substantially parallel prior to tightening of the conduit joint.

The outer sealing portion beneficially extends in opposing directions transversely from the web portion, where the extension carrying the annular seal lips have substantially the same dimensions. This means that substantially the same sealing characteristic is provided between the flanges 2 and 3 and the seal ring.

The outer incline surface of the ridge portion beneficially slopes towards the seal ring in an inwardly radial direction, and the radially inner incline surface beneficially slopes towards the seal ring in an outwardly radial direction. The surface of the ridge portion beneficially slopes away from the interface and the ridge portion is beneficially trapezoidal in cross section.

The inventor has determined that dimensions of one sealing portion can be larger than those of the other sealing portion, allowing it to exert higher contact pressure at its seal lips. The higher contact pressures are balanced by radial compression or expansion forces in the seal ring as a whole, when the joint is tightened. Excessive deformation of the other sealing portion can be prevented. This allows different dimensions for two sealing portions and thus different contact pressures exerted by the seal lips to be independently selected. A seal ring in which the thickness of the inner sealing portion and thus the contact pressures that are exerted thereby are greater than those of the outer sealing portion can be successfully employed, meaning that the strength of the inner and outer seal can be controlled depending on specific requirements. For example, it is envisaged that at significant ocean depths the pressure on the outside of a pipe may be greater than that inside the pipe. As such the outer seal may be strengthened compared to the inner seal by increasing the contact pressure.

Also according to the present invention there is a seal ring comprising an inner integrally formed sealing portion, an outer integrally formed sealing portion, and an interconnecting web portion, the inner sealing portion comprising a pair of annular seal lips facing the outer sealing portion and extending in a transverse direction to the web portion, the outer sealing portion comprising a pair of annular seal lips facing the inner seal portion and extending in a transverse direction to the web portion, which web portion extends radially between the pair of seal lips on the inner seal portion and the pair of seal lips on the outer seal portion, wherein each seal lip projects in a direction substantially perpendicular to the radial direction, and wherein the cross section of the seal ring is non symmetrical about the line perpendicular to the radial point of the web portion.

Joints intended for use in deep sea environments are normally referred to as flanges and the conduit or vessel defining members are normally referred to as hubs. The hubs generally conform in sizes and shapes to agreed international standards.

BRIEF DESCRIPTION OF THE DRAWINGS

An exemplary embodiment of the present invention will now be described with reference to the drawings in which.

DETAILED DESCRIPTION OF PREFERRED EMBODIMENTS

Figure 1:
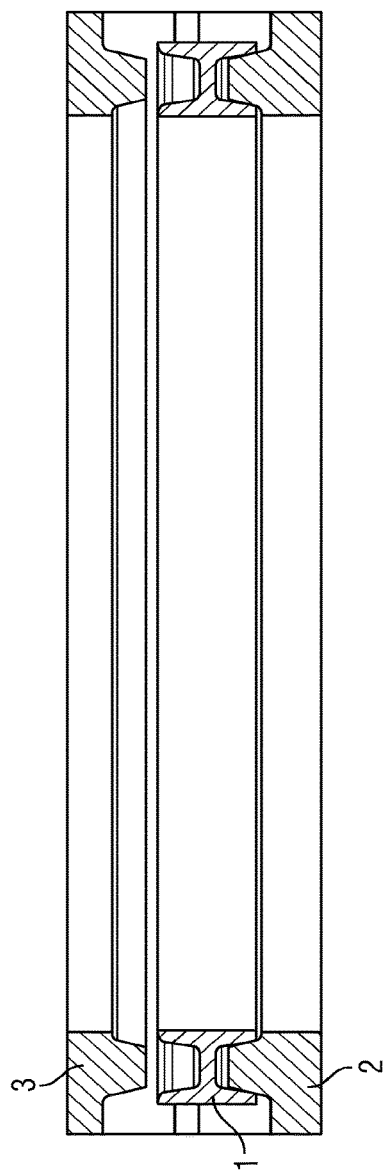
FIG. 1 is a part cross sectional view of a partially assembled joint.
Figure 2:
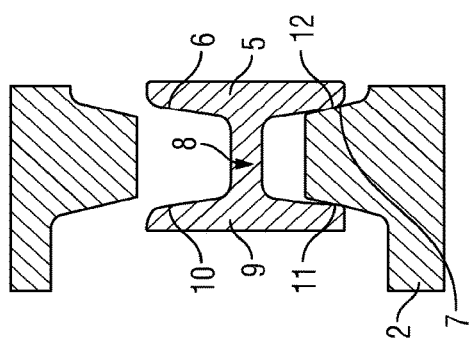
FIG. 2 shows a part cross sectional view a joint before it is tightened.
Figure 3:
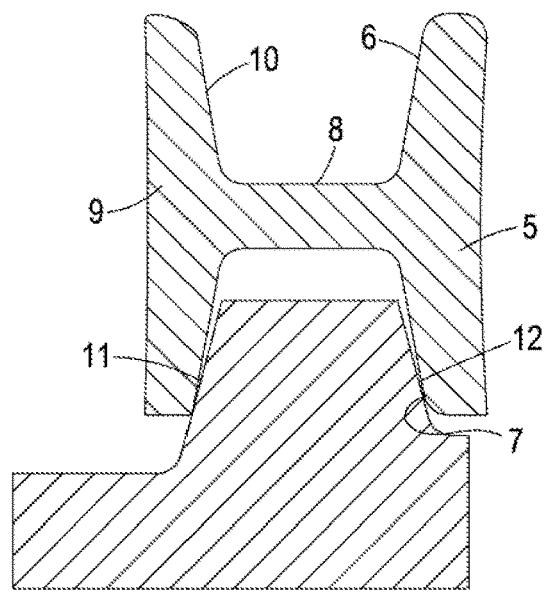
FIG. 3 shows a part cross sectional view (for clarity only) of the same joint when one flanged member of the joint is fully closed.
Figure 4:
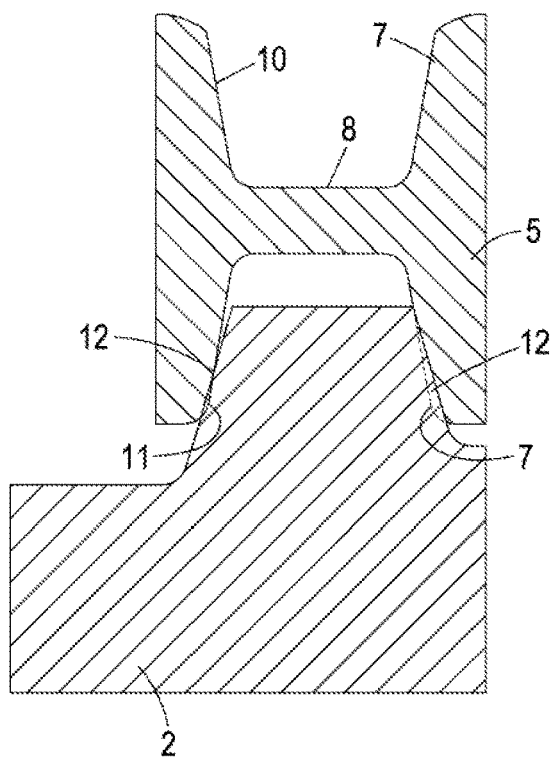
FIG. 4 shows the theoretical overlaps that would have occurred in respect of the seal ring of FIG. 3 had the sealing portions not been deformed.

As shown in FIG. 1 the joint comprises first and second conduit or vessel defining members in the form of flanges 2 and 3 and an annular seal ring 1. As shown seal ring 1 is engaged with one flange 2 and a second flange 3 is separated therefrom. In use the connecting members are bolted together at an interface to define an axial fluid flow path or confined space, such as in a pressure vessel. FIGS. 2, 3 and 4 show a cross section a part of a connecting member 2 and seal ring 1 located to the left of centre of the axial fluid flow path through the joint. The annular metallic seal ring (typically of a forged nickel alloy, for example Alloy 625, Alloy 718, or Alloy X750) is provided at the interface interposed between the flanged members and serves to prevent fluid leaking out of the fluid flow path at the interface or into the joint at the interface. The seal may have to withstand internal and/or external pressures equivalent to depths of the order of 5,000 meters or above of sea water without leakage of fluid into the joint at the interface. This is particularly desirable when the joint is intended for use in deep sea environments.

The type and exact composition of the material used to make the seal ring is determined by, amongst other factors, the corrosive nature of the environment in which the seal is to be located, the temperature at which the seal is to be operated, and the materials compatibility with the material to be used to form the conduit or pressure vessel in which a joint is to be created and the seal ring employed. The material is beneficially selected such that the tensile strength is sufficient that on tightening of the conduit joint the seal ring deflects elastically and there is substantially no plastic deformation.

The annular seal ring 4 comprises an inner sealing portion 5 having angled sealing lips 6, 7 a web 8, and an outer sealing portion 9 having angled sealing lips 10, 11. Inner sealing portion 5 and outer sealing portion 9 both extend substantially transversely to the web portion. Inner sealing portion 5 is connected to the radially inner end of web portion 8 and outer seal portion 9 is connected to the radially outer end of web portion 8. As shown in FIGS. 2 and 3 the conduit or vessel defining members are each provided at the interface with an annular ridged portion 20 each comprising a radially outer surface sloping towards said seal ring in an inwardly radial direction, and a radially inner surface sloping towards the seal ring in an outwardly radial direction.

As shown the inner sealing portion forming the main seal is thicker than and operates at a higher pressure than the outer sealing portion. The inner and outer sealing portions 4 and 9 are located inside and outside respectively the annular ridged portions. As flanged members 2 and 3 are moved towards each other, the inner sealing lips 6 and 7 have radial positions such that they should be equally first to engage and engage with seal faces on sloping inside faces 12 on the annular ridged portions. This causes flange members 2 and 3 to align with each other if they are not already aligned. As shown in FIG. 2, the sealing lip 7 seats against the sloping face 12 of the annular ridge portions. The outer sealing portion and in particular the sealing lip 11 can be seen not to be in contact with the sloping inside face of the annular ridge portion. Instead, a clearance gap is provided such that the seal lip 11 is offset or spaced apart from the ridged portion 2. Tightening of the joint causes an initial deformation of the inner sealing portion only at which point the outer sealing lips simultaneously engage the sloping outside faces on the annular ridged portions. Further tightening causes further deformation of the inner sealing portion and deformation of the outer sealing portions. The radial positions and spacing of said sloping faces relative to the seal ring and angles of said sloping faces determine the extent and rate of deformation of the inner and outer sealing portions. As the joint is tightened the contact pressures exerted by the flanged members on the inner and outer sealing portions is generally balanced by radial compression of the seal ring. When the joint is fully tightened, there is an extremely limited amount of deformation radially of the sealing portions 5, 9. Thus the contact pressures of the inner and outer sealing portions can be independently chosen, without worry that higher contact pressures exerted by one sealing portion will result in excessive deformation of the other sealing portion.

As can be seen in FIG. 2, the inner sealing portion 5 carrying the inner sealing lip 6 and 7 comprises a greater radial thickness than the opposing seal portion 9. This means that if a line is drawn perpendicular to the radial direction at the mid point of the web 8, the cross section of the seal ring is not symmetrical about this line. Accordingly, the outer sealing lip 6 and 7 will be closer to the mid point line than the outer sealing lips 10 and 11. Because of this, when the annular ridge portions 2R and 3R of flanged members 2 and 3, respectively, are engaged with the seal ring, contact between the flange and the inner sealing lip 6 and 7 as shown in FIG. 2 will be achieved. It is envisaged that the contact surface of the sealing lips 6 and 7 and 10 and 11 may be adjusted. For example, in one embodiment it is envisaged that the radial thickness of the inner and outer sealing portions 5, 9 carrying the sealing lips 6 and 7 and 10 and 11 may be of the same radial width, however, the inner sealing portion 5 may include a protrusion or extension thereon thereby having the effect of causing contact between the flange members 2 and 3 earlier than the contact that would be achieved between the flange members 2 and 3 and the sealing lips 10 and 11. Clearly, if the higher pressure contact is required on the outer sealing portion then the shape is reversed. It is important in the present invention therefore that non uniform contact between the flange 2, 3 and the inner sealing lips and outer sealing lips is achieved. Referring to FIG. 3, the flange member 2 of the conduit joint (flange member 3 is not shown in FIG. 3 or 4) is substantially fully engaged with the seal ring. Accordingly, an inner and outer seal is achieved between the sealing lip 11 and sloping face 12 of the annular ridge portion and also the sealing lip 7 and corresponding sloping face 12 of the annular ridge portion. As can be seen from FIG. 3, the inner sealing portion 5 which is of greater radial width than the radial width of the outer sealing portion 9, is deflected radially as is the sealing portion 9. Substantially elastic deformation occurs in the web portion 8 and also through deflection of the portions of the inner sealing portion 5 and outer sealing portion 9 carrying the seal lips. Once the conduit joint is released or undone, the seal ring will substantially deflect back to its original shape. Accordingly, as shown in FIG. 3, the contact pressure between the seal lip 7 and sloping face 12 is greater than between the seal lip 11 and the sloping face 12. The difference in contact pressures is balanced by the stresses in the seal ring which are predominantly compressive.

If a line is drawn radially through the portions of the inner and outer sealing portions 5, 9 which carry the seal lips, as has been previously described, the radial thickness or width of this portion is different. The sealing portion having the greater thickness is configured in order that contact is made with the ridge first leaving a clearance gap or space between the opposing seal lip and the ridge portion. Accordingly, as the conduit joint is tightened, a greater contact pressure is provided between the seal lip that contacts the ridge portion first and the ridge portion. Accordingly, the ridge portion is, therefore, of increased radial width or thickness to accommodate for this increased force.

The radial width or thicknesses of the inner and outer sealing portion carrying the inner and outer sealing lips may be different of the order of between 15% and 35% and will beneficially be approximately 20%. It will be appreciated that adjustment can, however, be made depending on specific sealing requirements for pipes undergoing different internal or external pressure situations.

It will be appreciated that extension of the web portion 8 substantially radially occurs and reduction of the thickness of the web portion in a substantially perpendicular direction to the radial reduces the strength of the web portion allowing increased radial deformation. In such situations, it may be beneficial to provide a plurality of spaced-apart apertures which even more beneficially may be provided at regular intervals extended through the web portion 8. This has the effect that the strength of the web portion 8 is reduced thus increasing the elastic deformation of the web portion that is possible.

FIG. 4 shows the theoretical overlaps that would have occurred had the sealing portions not been deformed and shows that the inner sealing portion although thicker can be deformed to an equal or greater extent than the thinner outer sealing portion without causing excessive distortion of the latter and allows it to operate virtually independently and provide higher contact pressures.

The present invention has been described by way of example only and it will be appreciated by a skilled addressee that modifications and variations may be made to the present invention without departing from the scope of protection afforded by the appended claims.

I claim:

1. A conduit joint comprising an annular seal ring comprising an inner elastically deflectable integrally formed sealing portion, an outer elastically deflectable integrally formed sealing portion, and an interconnecting web portion, the inner sealing portion comprising a pair of inner annular seal lips facing the outer sealing portion and extending in a transverse direction to the web portion, the outer sealing portion comprising a pair of outer annular seal lips facing the inner sealing portion and extending in a transverse direction to the web portion, the exposed surface of the seal lips being metal such that the metal surface of the inner sealing portion faces the outer sealing portion, and the metal surface of the outer sealing portion faces the inner sealing portion, which web portion extends radially between the pair of seal lips on the inner sealing portion and the pair of seal lips on the outer sealing portion, wherein each seal lip projects in a direction substantially perpendicular to the radial direction, wherein the cross section of the annular seal ring is non symmetrical about a line perpendicular to the radial direction at the midpoint of the web portion, and wherein the maximum radial width of the inner sealing portion is greater than the maximum radial width of the outer sealing portion, wherein the pair of inner annular seal lips slope radially outwardly and toward one another to the web portion, and wherein the pair of outer annular seal lips slope radially inwardly and toward one another to the web portion, the annular seal ring being interposed at an interface between a pair of flanged conduit or vessel defining members, the conduit or vessel defining members being each provided at the interface with an annular ridge portion, wherein upon initial seating of the annular ridge portion with the annular seal ring prior to tightening the joint, the metal surface of the inner seal lips contacts the annular ridge portion, whereas the metal surface of the outer seal lips are offset from the annular ridge portion by a clearance gap, and upon subsequent tightening of the joint the inner sealing portion deflects elastically radially inwardly such that the seal ring is radially compressed drawing the outer sealing portion radially inwardly such that the metal surface of the outer seal lips engage the annular ridge portion and the outer sealing portion deflects radially outwardly.

* * * * *